United States Patent [19]

Ostermeier et al.

[11] Patent Number: 5,205,498
[45] Date of Patent: Apr. 27, 1993

[54] CUTTER DEVICE FOR WOOD CHIPPER

[75] Inventors: Heinrich Ostermeier, Cologne; Dieter Dell, Wiehl, both of Fed. Rep. of Germany

[73] Assignee: SABO-Maschinenfabrik Aktiengesellschaft, Gummersbach, Fed. Rep. of Germany

[21] Appl. No.: 577,686

[22] Filed: Sep. 4, 1990

[30] Foreign Application Priority Data

Sep. 2, 1989 [DE] Fed. Rep. of Germany ....... 3929257
Aug. 3, 1990 [DE] Fed. Rep. of Germany ....... 4024757

[51] Int. Cl.⁵ .............................................. B02C 18/12
[52] U.S. Cl. ........................................ 241/55; 241/92; 241/101.7; 241/278.1; 144/176
[58] Field of Search ................. 144/180, 176, 163; 241/92, 101.7, 278 R, 55, 152 A, 278.1, 152.2

[56] References Cited

U.S. PATENT DOCUMENTS

| | | | |
|---|---|---|---|
| 3,346,027 | 10/1967 | Kirsten | 241/55 X |
| 3,759,304 | 9/1973 | Lundmark et al. | 144/176 X |
| 4,360,166 | 11/1982 | Biersack | 241/92 |
| 4,463,907 | 8/1984 | Biersack | 241/92 |
| 4,574,593 | 3/1986 | Nelson | 241/286 X |
| 4,669,516 | 6/1987 | Carpenter et al. | 241/92 X |
| 4,685,497 | 8/1987 | Mierau et al. | 241/92 X |
| 4,771,718 | 9/1988 | Carpenter et al. | 241/92 X |
| 4,860,961 | 8/1989 | Hilgarth | 241/152 A X |
| 4,984,747 | 1/1991 | Lechner | 241/55 |
| 5,076,504 | 12/1991 | Young | 241/286 X |

FOREIGN PATENT DOCUMENTS

| | | |
|---|---|---|
| 8310482 | 5/1981 | Australia . |
| 3031231 | 8/1980 | Fed. Rep. of Germany . |
| 3209873 | 3/1982 | Fed. Rep. of Germany . |
| 3619403 | 6/1986 | Fed. Rep. of Germany . |
| 2532559 | 9/1982 | France . |
| 634235 | 6/1978 | Switzerland . |

Primary Examiner—Mark Rosenbaum
Assistant Examiner—Frances Chin
Attorney, Agent, or Firm—Anderson Kill Olick & Oshinsky

[57] ABSTRACT

A cutting device for a chipper used in cutting up garden waste, such as branches, foliage, grass or the like, includes a rotatable cutter disk cooperating with a stationary counter knife located within a cutter housing. The counter knife extends across the cutter disk in a bridge-like manner. A counter brace along with a side support plate of the counter knife provide a support for the material to be chopped, so that a satisfactory cut is assured.

30 Claims, 9 Drawing Sheets

CUTTER DEVICE FOR WOOD CHIPPER

BACKGROUND OF THE INVENTION

The present invention is directed to a cutter device for a wood chipper or shredder for cutting up garden waste, such as branches, foliage, grass or the like. The cutter device comprises a slotted cutter disk rotatably supported in a cutter housing and driven by a motor. Cutter blades are detachably secured on an upper surface of the disk and ejection vanes are located on its lower surface. A stationary counter knife cooperates with the cutter disk.

Such a wood chipper or shredder is known from DE 32 09 873 A1. The counter knife is stationarily secured and covers a portion of the cutter disk.

In addition, another wood chipper is known from DE 30 31 231 C2 where a coarse cutting knife is combined with the cutter disk.

SUMMARY OF THE INVENTION

Therefore, it is the primary object of the present invention to provide a chipper or shredder with a cutting device having an improved cutting effect without the cutting operation affecting the operator. In particular, the efficiency for the cutting of branches is improved.

In accordance with the present invention, the counter knife extends across the cutter disk in a bridge-like manner and it is detachably secured to the cutter housing.

The advantage of this arrangement is that the material to be cut has a support base at the counter knife and is retained so that an efficient cutting operation is achieved. With the detachable securement of the counter knife, it is possible to replace the cutter disk.

Preferably, the cutter knife extends over and covers the center of the cutter disk and its rotary axis. Replacement of the cutter disk is particularly simplified, if the counter knife is secured at the cutter housing so that it can be swiveled out of its operational position.

For accurate positioning and retention of the material to be cut during the chipping operation, a counter retainer or brace is provided. Various embodiments of this part are proposed.

In a first embodiment, the counter knife has a center section formed as a counter brace projecting from a support face of the counter knife. It is also possible, however, to form the counter brace as a truncated cone attached to and rotating with the cutter disk. With such arrangement it is assured that reeling or coiling of the garden waste is avoided by forming the rotating truncated cone with a smooth surface.

Further, the counter brace, covering the center of the cutter disk and with its connection to the cutter, prevents branches from affecting the cutter bearing.

In a preferred arrangement, however, the counter brace has a vane-like configuration and is attached to one end of the counter knife in the region of its attachment of the cutter housing.

A favorable flow and support of the material being cut is obtained if the counter brace is formed as a partial cone or a truncated cone tapering inwardly away from the surface of the cutter disk and having an axis forming an extension of the axis of rotation of the cutter disk.

In a desirable arrangement, the abutment or support surface or face of the counter knife is flat and inclined with respect to the cutter disk. The angle of inclination can correspond to the angle of the partial cone or the truncated cone forming the counter brace. The abutment face when viewed in cross section forms a complement of the outer configuration of the partial cone. Preferably, the counter brace is connected to the support surface by fillets.

In accordance with the invention, the counter knife is fastened to the cutter housing in a resilient manner, so as to dampen vibration and reduce the noise generated when the chipper is operated. In a preferred arrangement, the resilient mounting is effected by supporting the counter knife on rubber elastic support pieces against the cutter housing. Rubber with a high dampening property can be used for this purpose.

A centrally arranged counter brace provided with a recess facing the center of the cutter disk can be used for improving the protection and attachment of the cutter disk, with the recess extending over a hub expansion of the cutter disk.

According to another feature of the invention, the screw for securing the cutter disk on the drive shaft is received in the recess of the counter brace so that it is countersunk in the recess. The recess provides a clearance with respect to the hub extension. Such clearance affords the free mobility of the counter knife within the limits of the resilient properties of the rubber-elastic support pieces. Still another feature of the invention is the arrangement of a thrust bearing in the recess of the counter brace which is displaceably supported against resilient pads so that the bearing along with the counter knife abuts axially against the adjacent end face of the hub extension. Due to this arrangement, the counter knife with its detachable securement feature can be used as a type of quick action latch when replacing the cutter disk.

For the improvement of cutter disk replacement, it is proposed in an additional version to provide the cutter housing with an aperture serving for access to the counter knife. Such aperture is closed by a detachable cover in the form of a cover plate supplementing the support space for the counter knife. In cross section, the cover plate forms an obtuse angle with a support face. This cover plate directs the material to be cut in the direction of the exposed portion of the cutter disk. Preferably, the cover plate is inclined at an angle representing a continuation of the configuration of the surface of the partial cone of the counter brace.

Favorable cutting conditions are afforded if three cutter blades are secured to the cutter disk and spaced apart around its circumference.

To improve the cutting of thin, flexible branches, in another embodiment of the invention, the cutter disk includes at least one coarse cutting knife radially offset relative to its axis of rotation. The coarse cutting knife has a cutting edge projecting upwardly from the surface of the cutter disk bearing the cutter blades and the counter knife has a recess extending toward the surface of the cutter disk and containing the coarse cutting knife with the recess extending across the height of the coarse cutting knife, however, only for a portion of its rotational diameter.

The coarse cutting knife, arranged in the region of the center of the cutting disk, is also bridged by the counter knife and is covered by the counter knife from above so that the branches and loose items are comminuted at the cutting edge of the counter knife cooperating with the coarse cutting knife. With this covered arrangement branches can not be wound around the cross cutting knife and, as as result, they are cut up. This feature prevents a possible blockage and any resulting overload.

If a coarse cutting knife is not provided, it is nevertheless favorable to provide the middle section of the counter knife disposed across the center of the cutter disk with a recess corresponding to the recess normally provided for receiving the coarse cutting knife. In this arrangement, a slot towards the surface of the cutter disk is formed. Such a slot prevents flexible branches from winding around the axis of the cutter disk. Any branches which reach the rear side of the counter knife through the aperture are cut up from the rear side by running up against the counter knife.

To eliminate entirely blockage of its rear side, the cutter disk can be provided with radially extending vanes rotating in the recess and projecting upwardly from its surface. Such vanes impart an additional rotational impulse to the material which has reached this region and direct it to the rear side of the counter knife where it is cut up. If two diametrically arranged coarse cutting knives are provided, it is proposed to attach them to the cutter disk angularly offset with respect to the radially extending vanes.

Favorable cutting condition for the coarse cutting knives is achieved if the cutting edge of the knives is inclined with respect to the axis of the cutter disk so that as the knife extends outwardly from the cutter disk surface it moves closer to the cutter disk axis. The operation of the coarse cutting knife is assisted if the wall of the recess is shaped as a portion of a truncated conical bore.

In a preferred arrangement, receiving recesses are arranged at the surface of the cutter disk. An angularly shaped coarse cutting knife has one leg extending parallel to the surface of the cutter disk in the recess in a positively locked manner bolted to the disk.

Favorably chipped or shredded material is achieved when it has arrived at the rear side of the counter knife, particularly if the bottom surface facing away from the support face of the counter knife and facing the surface of the cutter disk encloses an acute angle with the surface of the cutter disk.

In the event stoppage due to blockage or due to an overload should occur, the cutter disk can be provided with an actuation lever for freeing it by rotating the disk. Accordingly, bores are arranged spaced around its outer circumference into which the actuation lever can be inserted.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAIL DESCRIPTION OF THE INVENTION

Figure 1:
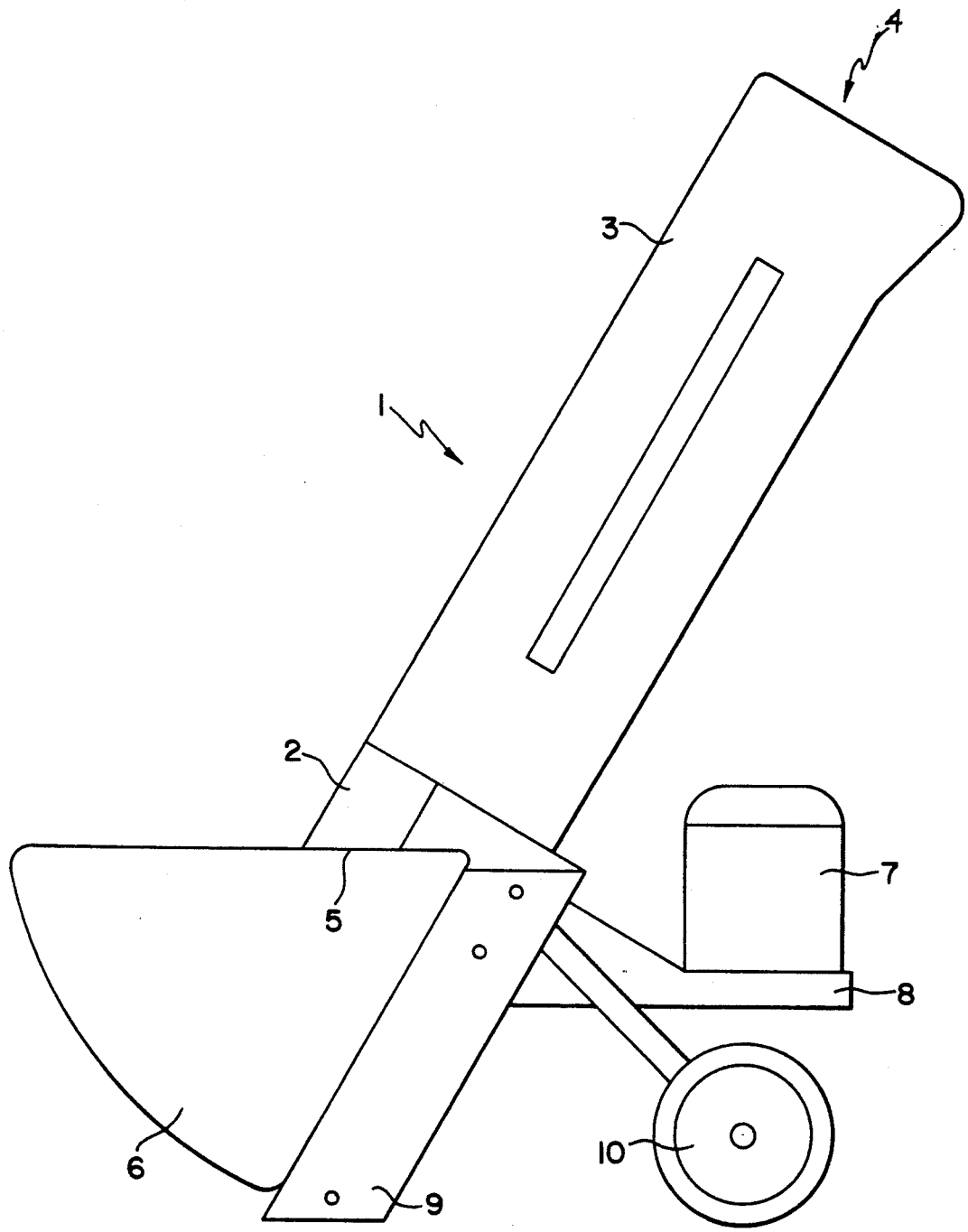
FIG. 1 is an elevational view of a chipper embodying the present invention.

In FIG. 1 a chipper or shredder 1 consists essentially of a cutter device 2 and an inlet passageway 3 through which the material to be cut is fed through a charging aperture 4 to the cutter device. A collection member 6 is connected to an ejection aperture 5 of the cutter device 2 into which the chipped material is directed. Cutter device 2 is driven by a drive motor 7. The drive motor can be an electric motor or an internal combustion engine attached to the cutter device 2 by a bracket 8. Further, a frame or support 9 with wheels 10 is connected to the cutter device 2 for supporting the chipper 1 on the ground.

Figure 2:
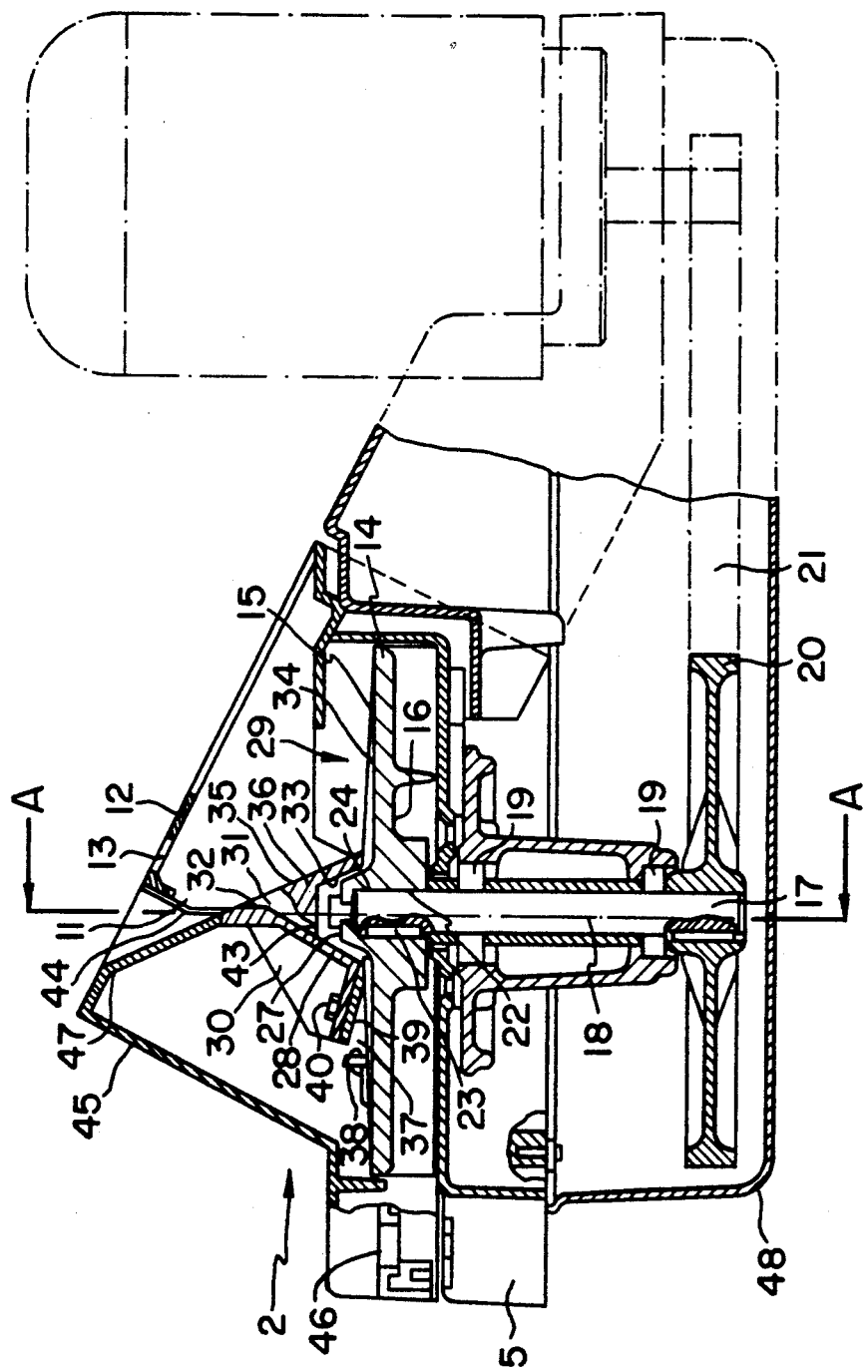
FIG. 2 is a side view, in section, of the cutter device in the chipper.
Figure 3:
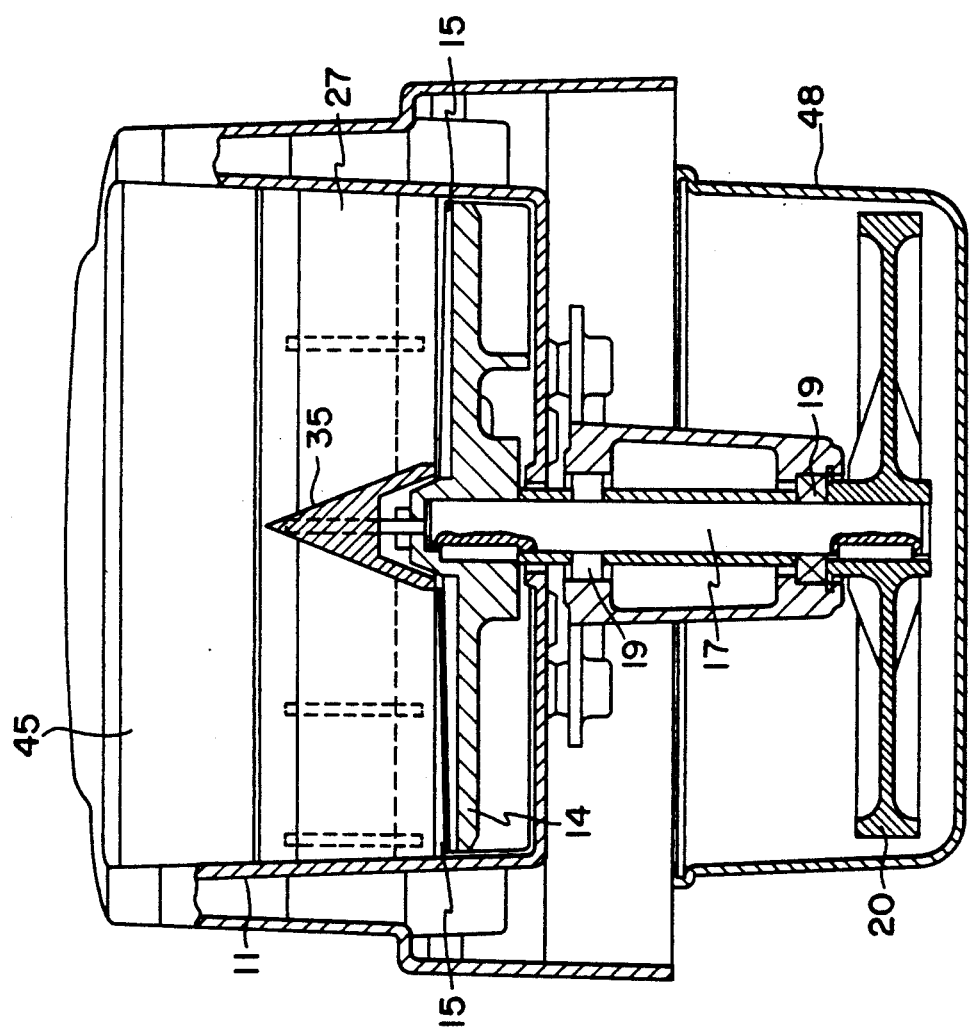
FIG. 3 is a sectional view taken along the line A—A in FIG. 2.

Cutter device 2 is illustrated in FIGS. 2 and 3. The cutter device 2 comprises a cutter housing 11 in which a cutter disk 14 is rotatably mounted. Cutter housing 11 has a junction face 12 provided with an aperture 13. The junction face 12 serves as a connection for the passageway 3. Cutter disk 14 comprises a disk 16 with cutter blades 15 attached to its upper surface. Disk 16 has slots in the region where the blades 15 are secured. The slots serve for the passage of the chipped material from the upper to the lower surface of the disk. Ejection vanes 16a are attached to the lower surface of the disk 16 and extend radially outwardly and are spaced apart around the circumference.

Cutter disk 14 is rotatably mounted on a drive shaft 17. Drive shaft 17 has an axis of rotation 18 and is rotatably supported by bearings 19 in the cutter housing 11. At the lower end of the drive shaft spaced from the cutter disk 14, a belt pulley 20 is secured and is connected by a belt 21 with another belt pulley on the drive motor 7, shown in phantom in FIG. 2. It would also be possible to directly connect the drive motor to the drive shaft or to replace the drive shaft with the power output shaft of the drive motor.

The drive and especially the belt pulley 20 and the belt 21 are enclosed by a hood 48 fastened to the cutter housing 11.

Cutter disk 14 has a hub bore 22 for detachably fixing the disk on the drive shaft 17 with the shaft fitted into the bore. Drive shaft 17 and cutter disk 14 are fixed to rotate as a unit by means of a key 23 and are fixed axially by an attachment screw 24 abutting an upper end face of a hub extension 25 located in the center of the disk. As can be seen more clearly in FIG. 6, hub extension 25 has a conical outer surface 26 tapering inwardly in the upward direction from the upper surface 34 of the disk 16. The cutting edges of the cutter blades 15 project upwardly from the surface 34. Preferably, three cutter blades 15 are spaced angularly apart around the outer circumference of the disk 16, note FIG. 10.

A counter knife 27 cooperating with the cutter blades 15 is located above the cutter disk 14 and is shown in detail in FIGS. 4 to 6, 12 and 13. Counter knife 27 extends across the counter disk 14 in a bridge-like manner and is supported at its ends by rubber-elastic support pieces 37 located in support recesses 38 in the cutter housing 11.

Figure 8:
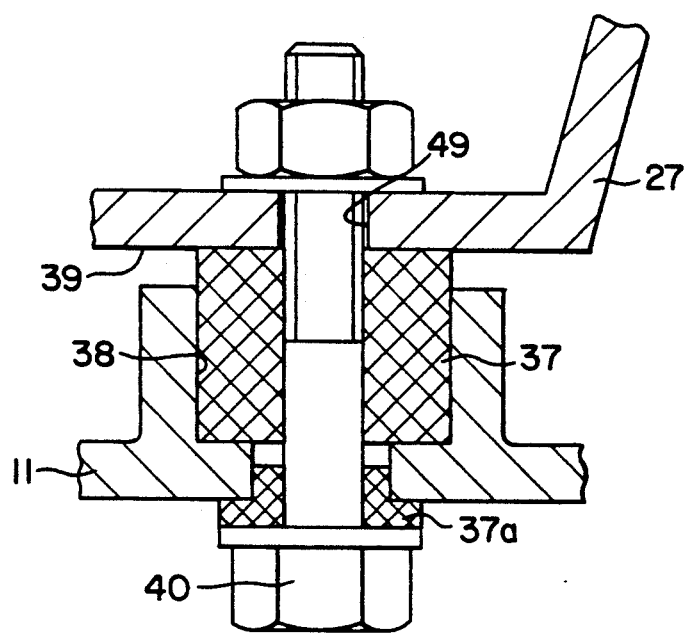
FIG. 8 is a detail of a support for the counter knife in the cutter housing.

The support for the counter knife 27 is shown in detail on an enlarged scale in FIG. 8 for one of the two support points in the cutter housing 11 for the counter knife 27. Support pieces 37 formed of a rubber material with a good dampening property are located in bearing recesses 38. The support pieces 37 are enclosed in a chamber-like manner. The counter knife 27 has a contact surface 39 bearing on the upper surface of the support piece 37. A bore or slot 49 extends through the contact face 39, note FIGS. 12 and 13. Moreover, cutter housing 11 has a bore at the bottom of the bearing recess 38. An attachment bolt 40 extends from the bottom through the bore in the cutter housing 11, then through the support pieces 37 and through the bore 49 in the counter knife 27. An additional support piece 37a formed of rubber or a similar dampening material is inserted from the lower side of the cutter housing 11 onto the bolt in the housing and the head of the bolt 40 abuts against the support piece 37a by means of an intermediate washer. This arrangement avoids direct contact of the bolt 40 with the cutter housing 11. As a result, noise development is prevented. Counter knife 27 only indirectly abuts against the cutter housing Il through the dampening support pieces 37, 37a. Bolt 40 has a nut threaded onto its upper end with the nut abutting through another intermediate washer with the surface of the counter knife directed oppositely to its support or bearing. The bore 49 for the passage of the bolt 40 in the counter knife 27 can be shaped as a slot affording the possibility of pivoting the counter knife 27 out of position if the other end of the counter knife is fixed in a bore 49. The two ends of the counter knife 27 are fixed to the cutter housing by identical bearing arrangements as illustrated in FIG. 8.

The counter knife 27 has a central section located over the center of the cutter disk 14 and is shaped as a counter brace or support 31 along with support faces 28 extending between the attachment points of the counter knife to the cutter housing 11. Reinforcing ribs 30 extend between the support faces 28 and the parts forming the contact faces 39. Support face 28 is arranged at an acute angle relative to the upper surface 34 of the disk 16 of the cutter disk 14. Counter brace 31 projects from the support face 28 oriented toward the exposed surface 29 of the cutter disk 14 and the counter brace extends over the center of the cutter disk 14. A recess 33 is provided in the surface of the counter brace 31 facing the upper surface 34 of the cutter disk 14. The counter knife 27 is arranged so that the hub extension 25 projects with its conical outer surface 26 into the recess 33 of the counter brace 31. Furthermore, the recess 33 is arranged so that the attachment bolt 24 is housed in a protected manner within the recess 33. A clearance is provided between the surface of the recess 33 and the outer surface 26 of the hub extension 25, whereby the cutter disk can be rotated without interference.

Figure 5:
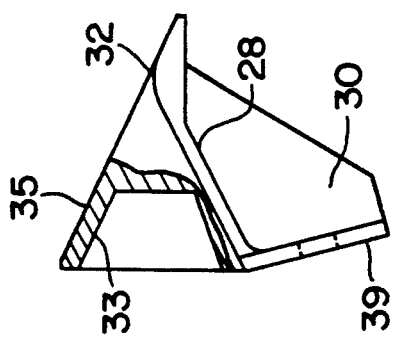
FIG. 5 is a side view of the counter knife.
Figure 4:
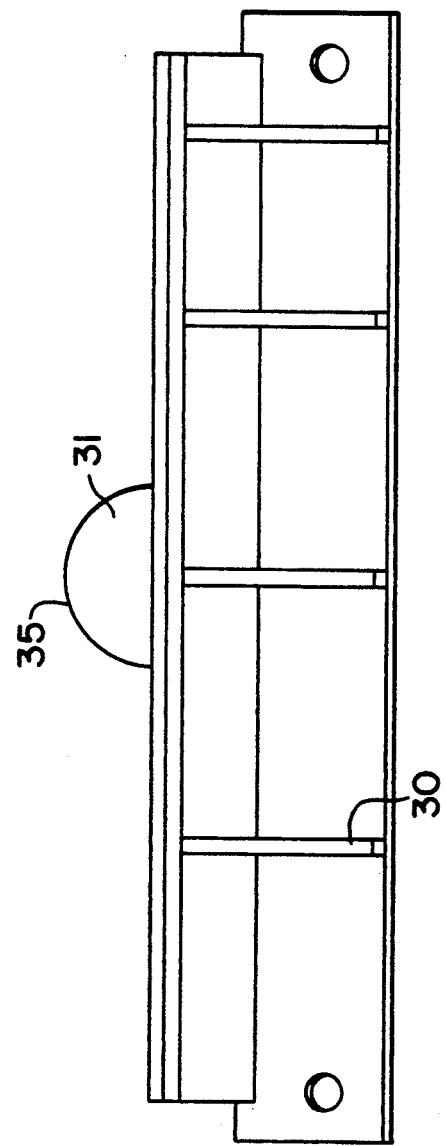
FIG. 4 is a plan view of the counter knife.

The counter brace 31 is shaped as a conical member, as can be seen particularly in FIGS. 4 and 5. The counter brace forms a partial cone 35 with its outer surface extending at an obtuse angle with respect to the upper surface 34 of the disk 16. The partial cone is arranged to extend away from the exposed surface 29 at the obtuse angle. The cone axis 36 of the partial cone is axially aligned with and forms an extension of the rotary axis 18 of the cutter disk 14. As viewed in FIG. 2, it can be noted that the support face 28 for all intents and purposes complements the outer surface of the partial cone 35. The outer surface of the partial cone converges by a radius 32 into the support face 28. A cover plate 47 is formed by the upward extension of the outer surface of the cone 35. Plate 47 forms a part of cover 45 and provides a closure for opening 44 in the cutter housing 11. Cover 45 is secured by screws 46. The installation or removal of the counter knife 27 and the cutter disk 14 is possible through the aperture 44. Cover plate 47 forms an obtuse angle with the support face 28 and is shaped so that the cover plate affords an extension of the outer configuration of the partial cone 35.

In the embodiment shown in FIGS. 2 and 3, the installation of the counter knife 27 secures the cutter disk 14 and provides an indication if the attachment bolt 40 is not completely threaded into the drive shaft 17 for securing the cutter disk 14 in place. If the attachment bolt 40 is inserted but not completely tightened, the attachment of the counter knife 27 to the cutter housing 11 is not possible. As a result, an operator can determine that the chipper can not be operated. Only if the attachment bolt 40 is threaded for a sufficient depth into the drive shaft 17, adequate spacing results with respect to the walls of the recess 33, so that the counter knife 27 can be placed in contact with the support pieces 37.

Figure 6:
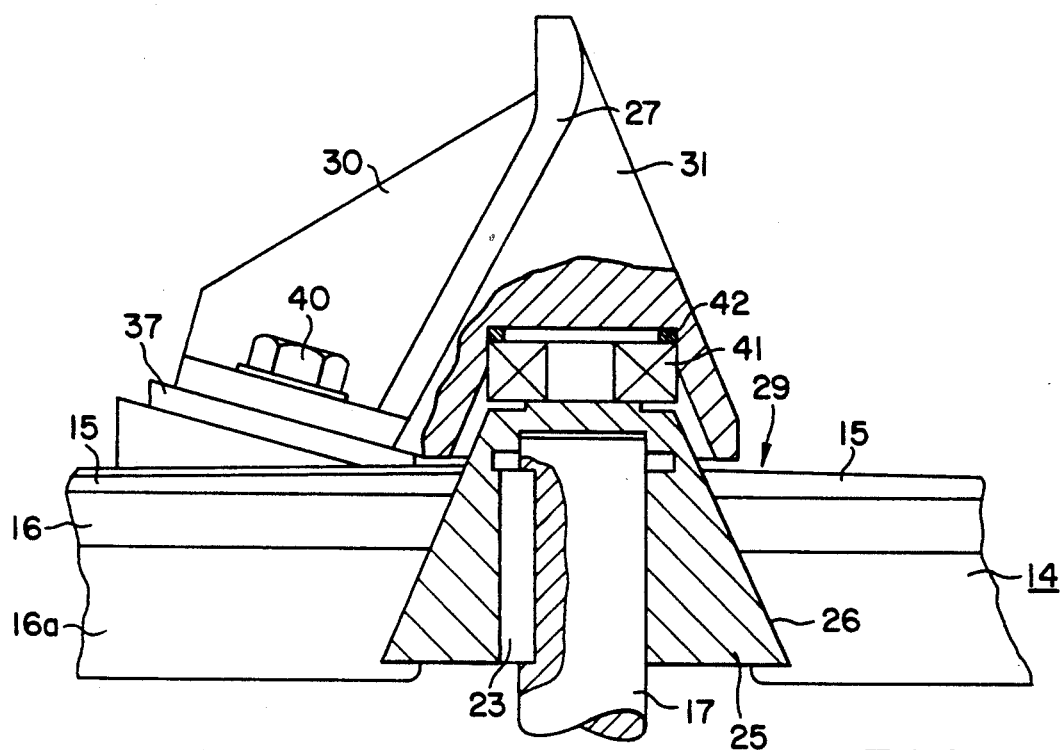
FIG. 6 is a detail view on an enlarged scale of the counter brace and of the region of the cutter disk covered by the brace with an abutment formed by a thrust bearing as an alternative to the embodiment in FIG. 2.

In FIG. 6 another embodiment is illustrated where the counter knife 27 is used to secure the cutter disk axially on the shaft 17. In this embodiment, a thrust bearing 41 is supported on a resilient pad 42 in the recess 33 of the counter brace 31. The thrust bearing abuts at its lower surface against the upper end face 43 of the hub extension 25 forming a part of the disk 16 of the cutter disk 14.

Figure 7:
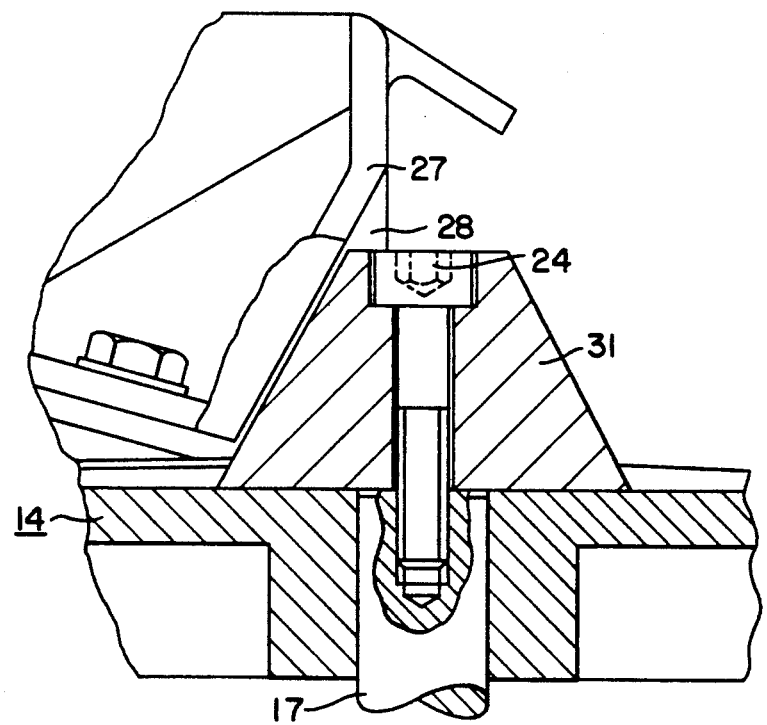
FIG. 7 is a detail, partly in section, of a rotating counter brace.

Another embodiment is shown in FIG. 7. Counter knife 27 with support face 28 is illustrated. Cutter disk 14 is retained on the drive shaft 17 by a truncated cone. The truncated cone 31 forms the counter brace and in this embodiment it rotates together with the cutter disk and is separate from the counter knife. The counter brace 31 has a stepped bore. A bolt 24 is inserted into the stepped bore and is tightly threaded into the drive shaft 17. The conical outer surface of the counter brace 31 corresponds to the slope of the support face 28 of the counter knife 27.

Further embodiments of the cutter disk 14 and the counter knife 27 are displayed in FIGS. 9 to 13. A cutter disk 16 with coarse cutting knives 51 is displayed in the FIGS. 10 and 11.

Figure 9:
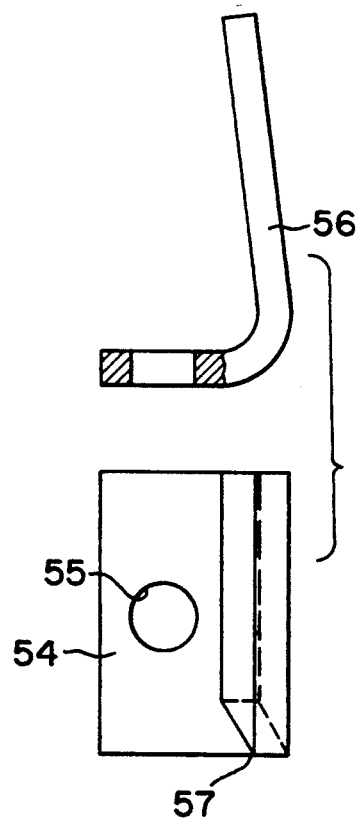
FIG. 9 is a side view, partly in section, and a top view of a coarse cutting knife.
Figure 11:
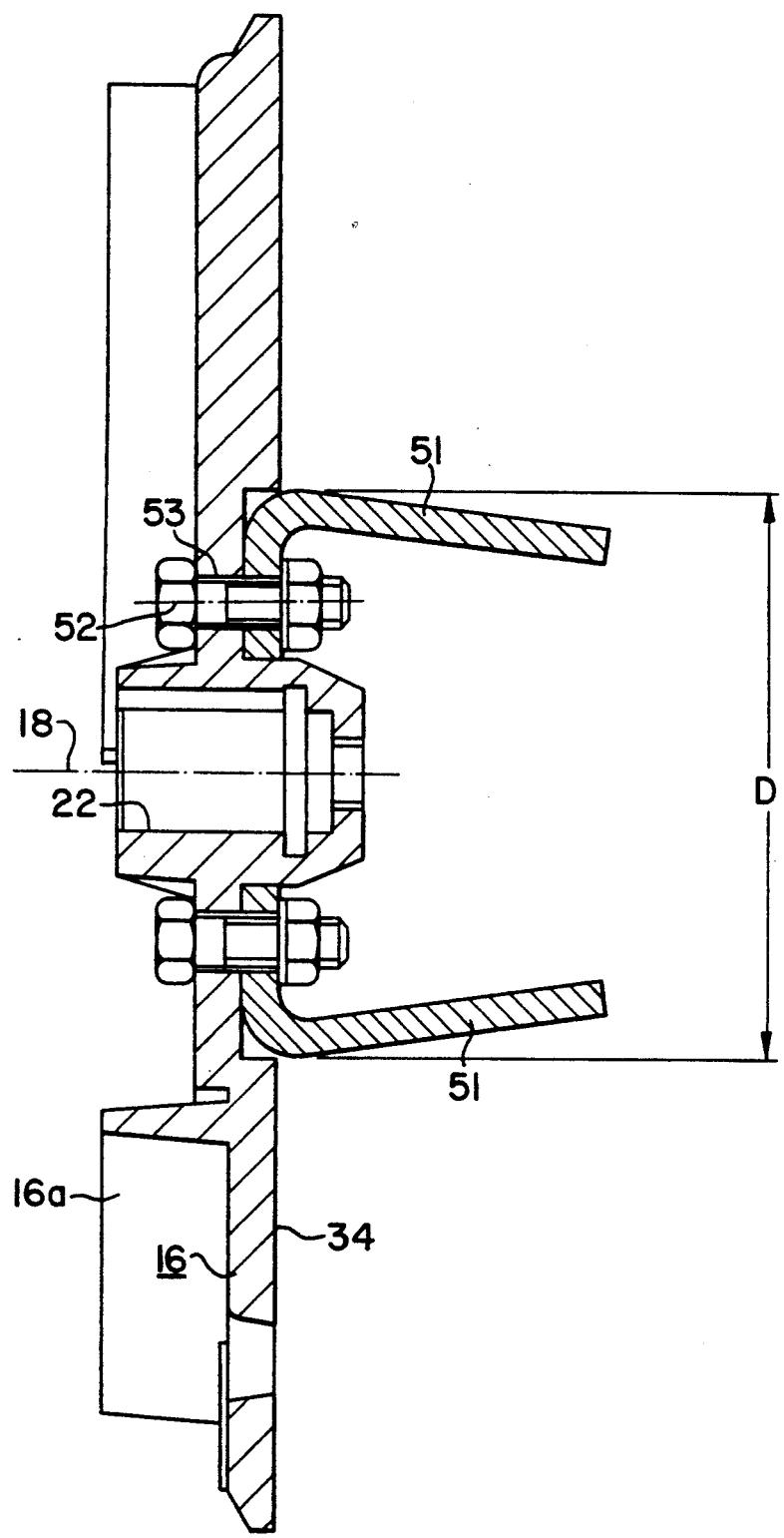
FIG. 11 is a sectional view of the cutter disk in FIG. 10 and also illustrating the coarse cutting knives.
Figure 12:
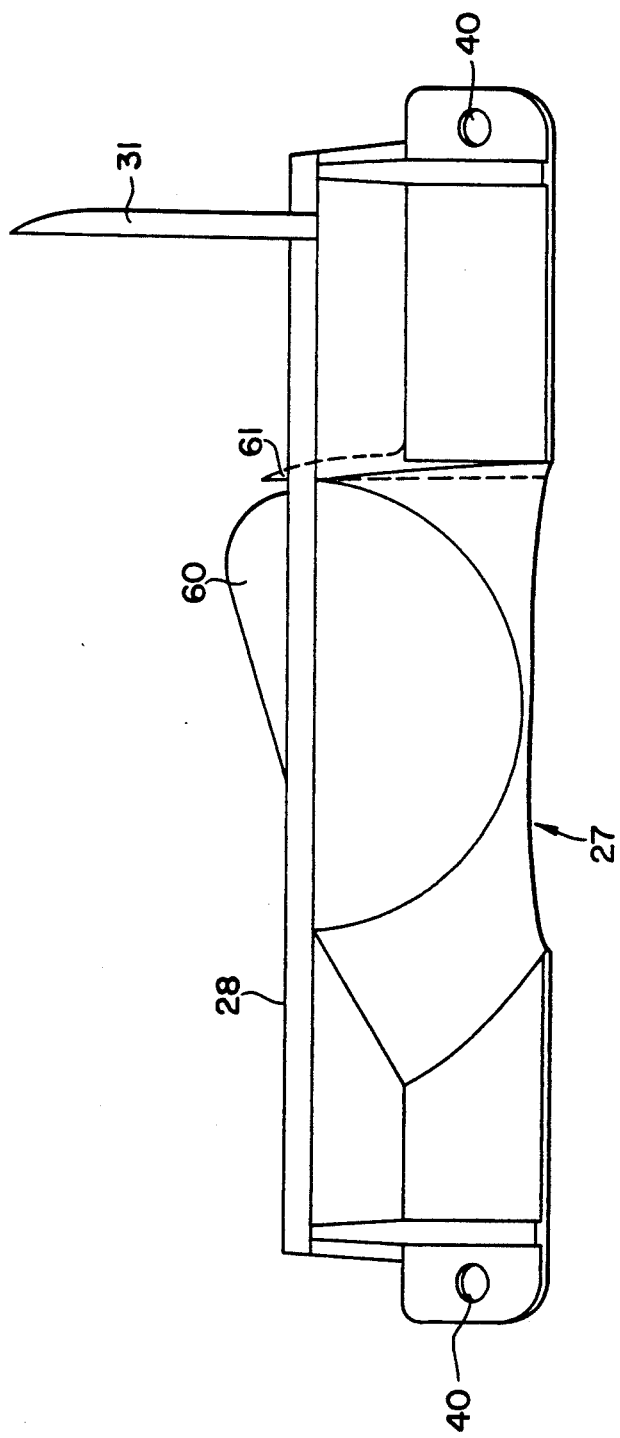
FIG. 12 is a plan view of the counter knife with a recess shown as an individual part.

Two coarse cutting blades 51 located diametrically opposite one another are shown in FIG. 11 and are arranged in recesses 50 in the upper surface 34 of the cutter disk 14 or disk 16. It can be noted that the coarse cutting knives 51 are located eccentrically relative to the axis of rotation 18. Bolts 52 extend through bores in the coarse cutting knives 51 and are threaded into threaded bores 53 in the disk 16. One of the coarse cutting blades 51 is illustrated in FIG. 9 as a individual part exhibited in side view and in plan view. The coarse cutting knife 51 is made from flat bar steel and is bent into an angle or elbow shape. The knife 51 has a short leg 54 secured in the recess 50 in the disk 16 by a bolt 52 extending through the bore in the short leg 54 of the knife. A long leg 56 has a cutting edge 57 leading in the rotational direction. Long leg 56 is bent relative to the short leg so that it converges inwardly toward the rotational axis 18 of the cutter disk 14 as it extends outwardly from the upper surface 34.

Figure 10:
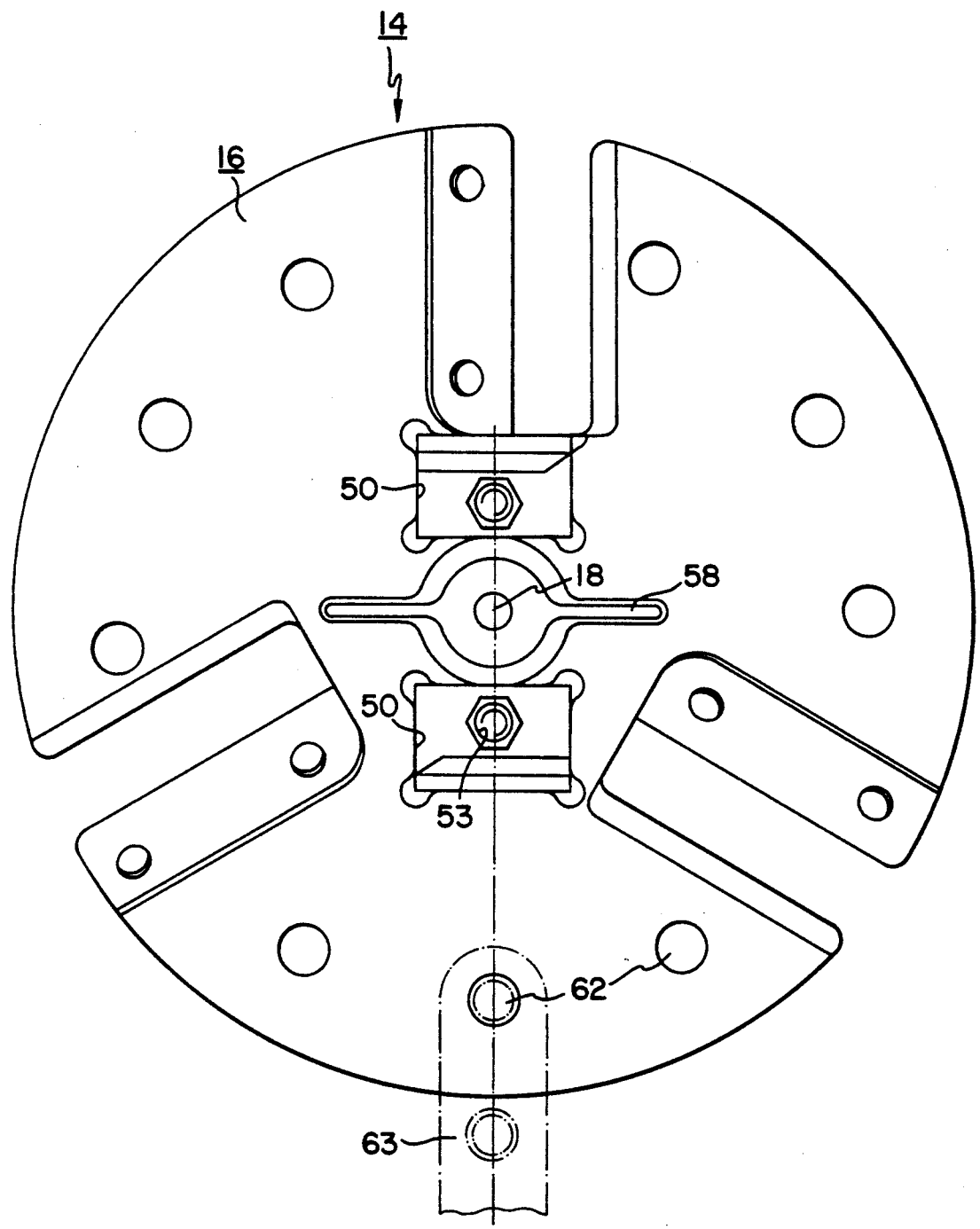
FIG. 10 is a plan view of the upper surface of the cutter disk including coarse cutting knives.

As can be seen in FIG. 10, vanes 58 are spaced in the circumferential direction from the coarse cutting blades 51 and extend from the upper surface 34 of the disk 16. The coarse cutting blades 51 are at least partially covered by the counter knife 27 extending across the cutter disk 14. Counter knife 27 has a recess 59 for this purpose which is in part shaped as a truncated conical bore. The rotational diameter D of the coarse cutting blades 51 is greater than the width of the counter knife 27 extending over the cutter disk. Counter knife 27 is arranged with respect to the rotational axis 18 so that the rotating coarse cutting blades 51 extend from the support face 28 against which the material to be cut comes to rest. A deflector 60 projects from the support face 28 and prevents branches from passing into the region between the coarse cutting knives 51 and causing blockage.

Figure 13:
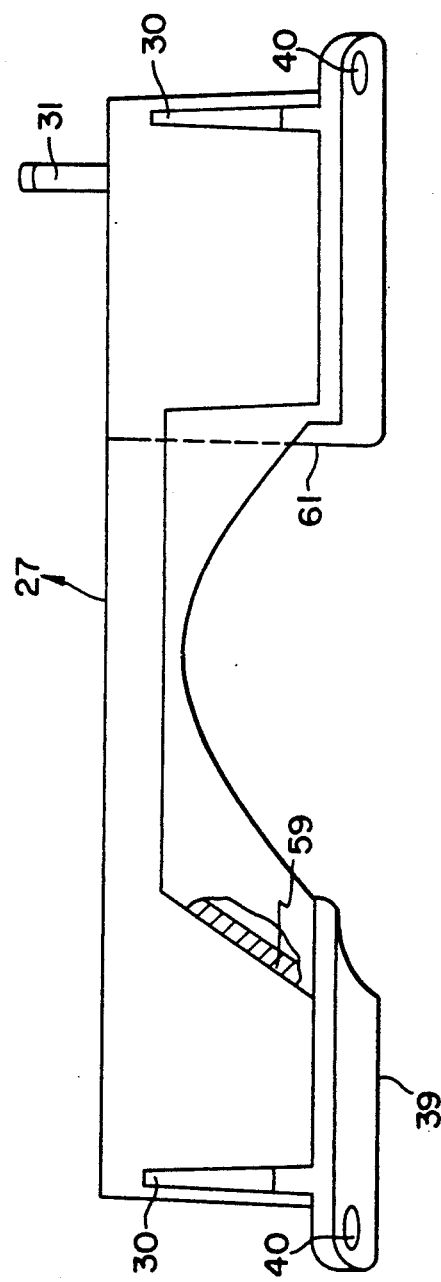
FIG. 13 is a rear view of the counter knife displayed in FIG. 12.

The cutting edge 57 of the coarse cutting knives 51 cooperates with a counter cutting edge 61 projecting from the support face 28 of the counter knife 27. When the cutting edge 57 moves pass the counter cutting edge 61, a larger gap develops away from the upper surface 34 of the cutter disk than towards the upper surface due to the angle bend towards the top. This feature enables clean cutting. The deflector 60 prevents larger branches from reaching the region of the cross coarse-cutting knives 51 when they contact the support face 28 and being seized by the coarse cutting knives, rather the branches continue to move in the direction of the counter brace 31 formed on one side of the counter knife 27. Material which has been captured by the coarse cutting knives 51 is in part also conveyed through the recess 59 to the lower side as shown in FIG. 13. Because of the additional vanes 58, this material is moved radially outwards and is captured by the cutter blades 15 on the cutter disk 14 and moved against the support plate 39 and thus is cut. Support plate 39 is arranged at an acute angle with respect to the upper surface 34 of the cutter.

Cutter disk 14 as shown in FIGS. 10 and 11 can also be used without coarse cutting knives 51. The vanes 58 cause small size material reaching the region of the recess 59 to be ejected to the rear side of the counter knife 27 or towards the front and thus arrive in the region of the cutter blades 15 and come to rest against the support face 28 or the support surface 39 of the counter knife where it is cut by the cutter blades 15.

Should blockage occur, the cutter disk can be rotated manually by means of a lever 63 which can be inserted with a lug into circumferentially spaced bores 62 in the disk 16 and abuts with a collar or an additional lug at the outer edge of the disk.

In this regard reference is made to FIG. 10 where an actuating lever 63 is shown in phantom.

While specific embodiments of the invention have been shown and described in detail to illustrate the application of the inventive principles, it will be understood that the invention may be embodied otherwise without departing from such principles.

We claim:

1. A cutting device for a chipper used for cutting garden waste, such as branches, foliage, and grass, comprises a cutter housing, a generally horizontal slotted cutter disk having an axis of rotation and rotatably supported in said housing, a motor arranged to rotationally drive said drive about the axis of rotation, said cutter disk having an upper surface and an oppositely facing lower surface with cutter blades detachably secured to said upper surface and ejection vanes secured to said lower surface, a stationary counter knife located within said housing in spaced relation to and cooperating with said cutter blades, said counter knife extends above and across the upper surface of said cutter disk in a bridge-like manner traversing and covering the axis of rotation of said cutter disk and is detachably secured to said cutter housing on generally diagonally opposite sides thereof.

2. A cutting device, as set forth in claim 1, wherein said counter knife is releasably secured to said cutter housing for pivoting said counter knife out of its operating position.

3. A cutting device, as set forth in claim 1, wherein a counter brace is provided in said cutter housing in cooperation with said counter knife.

4. A cutting device, as set forth in claim 3, wherein said counter brace is formed on one side of said counter knife.

5. A cutting device, as set forth in claim 3, wherein said counter brace is part of a central section of said counter knife and projects upwardly from a horizontal support face of said counter knife.

6. A cutting device, as set forth in claim 5, wherein said counter brace is formed as a partial cone tapering from the upper surface of said cutter disk and having an axis aligned with the axis of rotation of said cutter disk.

7. A cutting device as set forth in claim 6, wherein the support face of said counter knife is planar and extend at an oblique angle relative to the upper surface of said cutter disk.

8. A cutting device, as set forth in claim 7, wherein said cutter housing has an aperture affording access to said counter knife, a removable cover plate closes said aperture and forms a continuation surface of the support face of said counter knife and said continuation surface forms an obtuse angle with the support face viewed in cross section.

9. A cutting device, as set forth in claim 8, wherein said cover plate extends at an angle forming a continuation of the outer surface of said partial cone of said counter brace.

10. A cutting device, as set forth in claim 5, wherein said counter knife has a support surface facing away from said support face and facing the upper surface of said cutter disk, and said support surface forms an acute angle with the upper surface of said cutter disk.

11. A cutting device, as set forth in claim 3, wherein said counter brace is separated from said counter knife and is a truncated cone secured to and rotating as a unit with said cutter disk.

12. A cutting device, as set forth in claim 11, wherein said truncated conical counter brace tapers from the upper surface of said cutter disk and has an axis aligned with the axis of rotation of said cutter disk.

13. A cutting device, as set forth in claim 12, wherein the support face of said counter knife is planar and extends at an oblique angle relative to the upper surface of said cutter disk.

14. A cutting device, as set forth in claim 13, wherein said cutter housing has an aperture affording access to said counter knife, a removable cover plate closes said aperture and forms a continuation surface of the support face of said counter knife and said continuation surface forms an obtuse angle with the support face viewed in cross section.

15. A cutting device, as set forth in claim 14, wherein said cover plate extends at an angle forming a continuation of the outer surface of said partial cone of said counter brace.

16. A cutting device, as set forth in claim 3, wherein said counter brace has a recess facing the center of said cutter disk and aligned over a hub extension of said cutter disk.

17. A cutting device, as set forth in claim 16, wherein an attachment bolt secures said cutter disk on said drive shaft and is spaced from a surface of said recess, and said hub extension has a clearance relative to said surface of said recess so that said extension can rotate without interference within said recess.

18. A cutting device, as set forth in claim 16, wherein a thrust bearing is supported against a resilient pad in said recess and said thrust bearing is supported on an end face of said hub extension.

19. A cutting device, as set forth in claim 1, wherein said counter knife is resiliently secured to said cutter housing.

20. A cutting device, as set forth in claim 19, wherein rubber-elastic bearing pieces are supported on said cutter housing, and said counter knife is supported on said rubber-elastic bearing pieces.

21. A cutting device, as set forth in claim wherein said cutting disk comprises three cutter blades spaced angularly apart around an outer circumference thereof.

22. A cutting device, as set forth in claim 1, wherein said cutter disk comprises at least one coarse cutting knife spaced radially outwardly from the axis of rotation of said cutter disk, said coarse cutting knife having a cutting edge leading in the direction of rotation of said cutter disk and extending outwardly from the upper surface of said cutter disk, said counter knife has a recess facing towards the upper surface of said cutter disk, and said coarse cutter knife is positioned and rotates within said recess, said recess extends for the height of said coarse cutting knife but only extends across a portion of its rotational diameter.

23. A cutting device, as set forth in claim 22, wherein said coarse cutting knife projects partially from the support face of said counter knife and from said recess where said cutter disk rotates.

24. A cutting device, as set forth in claim 22, wherein said cutting edge of said coarse cutting knives is inclined inwardly toward the rotational axis of said cutter disk outwardly from the upper surface thereof to a counter cutting edge of said recess.

25. A cutting device, as set forth in claim 22, wherein said recess has a wall forming part of a truncated conical bore.

26. A cutting device, as set forth in claim 22, wherein further recesses are formed in the upper surface of said cutter disk, said coarse cutting knives are angularly shaped each having a leg extending parallel to the upper surface and secured in a positively locked manner in one of said further recesses in said cutter disk.

27. A cutting device, as set forth in claim 1, wherein said counter knife has a central section covering the center of said cutter disk and said central section comprises a recess forming a gap facing toward the upper surface of said cutter disk.

28. A cutting device, as set forth in claim 27, wherein said cutter disk has radially extending vanes projecting outwardly from the central axis thereof and upwardly from the upper surface thereof and rotating in said recess.

29. A cutting device, as set forth in claim 28, wherein two diametrically arranged coarse cutting knives are provided offset circumferentially from said radially extending vanes, and said coarse cutting knives are secured to said cutter disk and are spaced radially outwardly from the axis of rotation of said cutter disk.

30. A cutting device, as set forth in claim 1, and further comprising actuating lever means for manually rotating said cutter disk, said cutter disk having bores therein in spaced relation in the region of the outer circumference thereof for receiving the actuating lever means.

* * * * *